Nov. 29, 1955     J. B. REICHERT     2,724,858
LUBRICATED WHEEL
Filed June 15, 1953
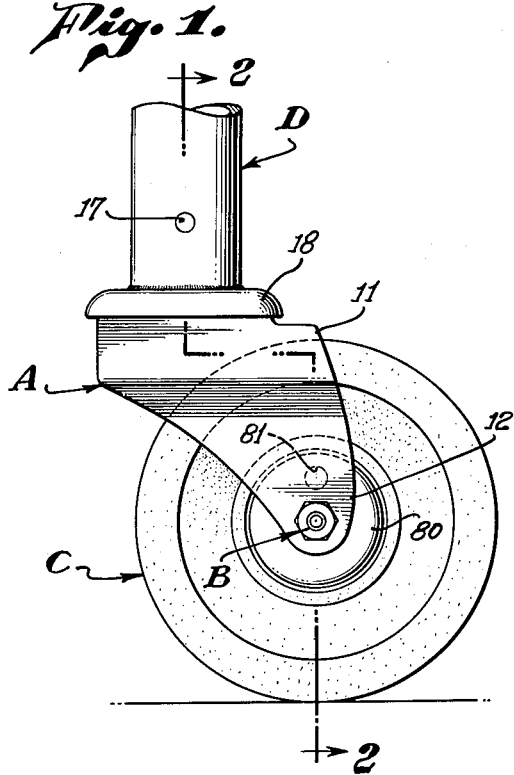
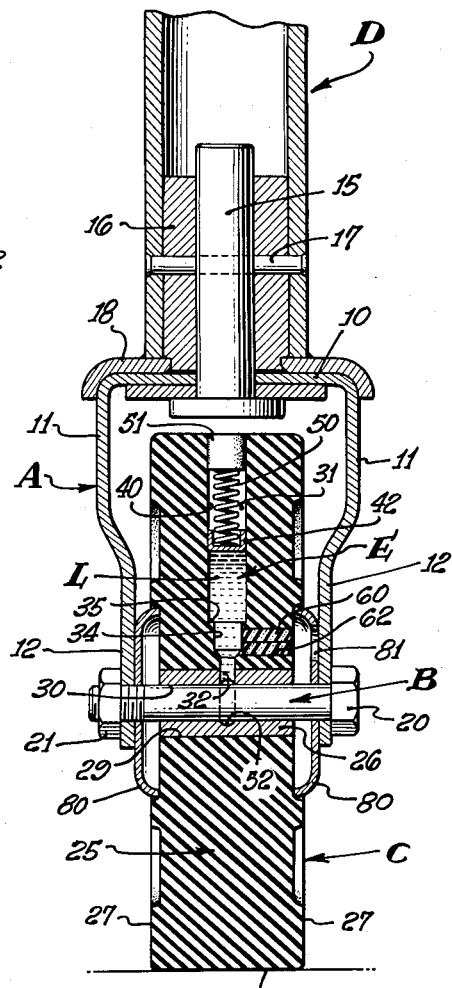
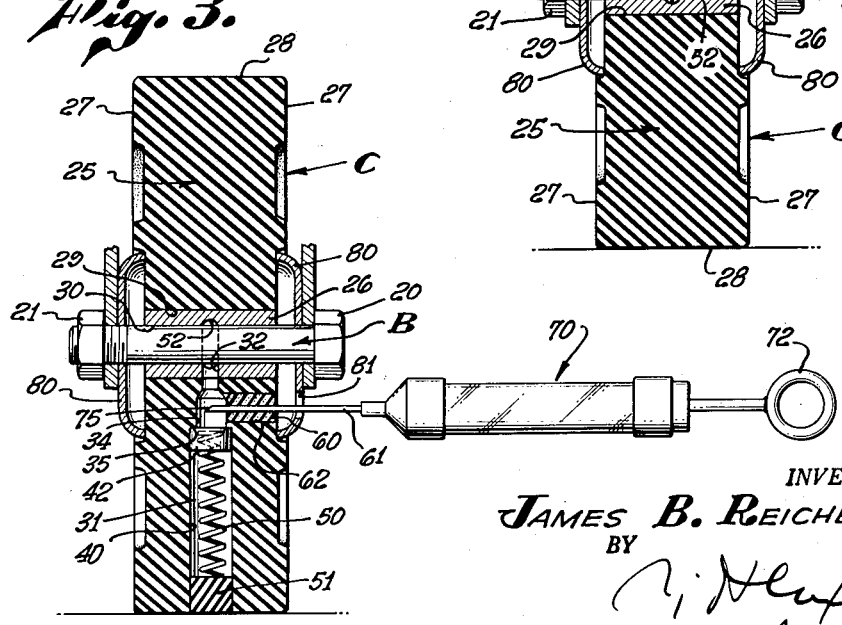
INVENTOR.
JAMES B. REICHERT,
BY
ATTORNEY.

United States Patent Office 2,724,858
Patented Nov. 29, 1955

2,724,858

LUBRICATED WHEEL

James B. Reichert, Rolling Hills, Calif.

Application June 15, 1953, Serial No. 361,798

7 Claims. (Cl. 16—36)

This invention has to do with a lubricated wheel and it is a general object of the invention to provide a simple, practical, improved unitary construction wherein relatively moving parts, such as a wheel on an axle, and a lubricating means serves to effectively and continuously maintain a lubricant under pressure and where engagement occurs between the wheel and the axle.

The construction as provided by the present invention is such that it can be used to advantage in various situations, however, since it is particularly useful and practical as applied to caster type wheels it will be referred to in that connection though it is to be understood that such reference is not to be interpreted as in any way limiting or restricting the principles of the invention.

Caster wheels or caster type wheels are used extensively in various situations and they vary widely in size, capacity, and in form or construction. It is common to initially establish or assemble ordinary caster wheels, or the like, in a lubricated condition so they operate properly or as intended, however, such mechanisms are seldom provided with adequate means for lubrication and if they are subject any appreciable amount of use the initial lubricant becomes dissipated or exhausted leaving the wheels dry and subject to wear and likely to make undesirable noises and vibrations in the course of operation.

It is a general object of the invention to provide a wheel structure and particularly a construction that can be incorporated to advantage in caster wheels and which is such as to supply such wheels with lubricant over an extended period of time so that they are subject to a minimum of wear, are silent and practical in operation, and require little or no attention or service.

It is another object of this invention to provide a wheel construction of the general character referred to which is such as to be incorporated in an ordinary wheel, say, for instance, a typical caster wheel without enlarging or encumbering the wheel in any way.

A further object of this invention is to provide a construction of the general character referred to which is such that it can be applied to or incorporated in the conventional type of wheel without involving complicated operations and without the addition of cumbersome, large, costly or complicated parts.

It is another object of this invention to provide a wheel construction of the general character referred to which is such that a substantial supply of the lubricant is carried by the wheel and is maintained under a pressure serving to feed the lubricant for use as it is required.

The various objects and features of my invention will be fully understood from the following detailed description of a typical preferred form and application of my invention, throughout which description reference is made to the accompanying drawings, in which:

Fig. 1 is a side elevation of a typical caster wheel embodying the present invention and showing the wheel mounted on a member in the form of a leg. Fig. 2 is an enlarged detailed sectional view taken substantially as indicated by line 2—2 on Fig. 1, and Fig. 3 is a view of a portion of the structure shown in Fig. 2 showing the lubricating means set to be replenished with lubricant.

The particular wheel embodying the present invention is in a mechanism in the nature of a caster wheel mechanism and the structure includes generally a yoke A, an axle B carried by the yoke, and wheel C carried by the axle. The yoke A is mounted on or carried by a support D which may be in the nature of a leg and the wheel C carries or is provided with the lubricating means E as provided by the present invention.

The yoke A is shown as including a head 10 which is horizontally disposed and as having legs 11 that depend from opposite edge portions of the head to have lower end portions 12 laterally off set from the head. The yoke illustrated in the drawings is provided with a stem 15 that projects upward from the head 10 of the yoke and in the particular case illustrated, the stem 15 serves as a means by which the yoke is connected to leg D. In the particular construction illustrated the leg D is tubular in form and at its lower end it is provided with a bushing 16 that receives the stem 15 projecting upward from the yoke. A suitable retainer such as pin 17 connects the stem 15 and the bushed leg as clearly illustrated in Fig. 2 of the drawings. In the particular case illustrated the leg D is provided at its lower or terminal end with a band plate 18 against which the head 10 of the yoke bears. In the case illustrated the head 10 is rotatable on or relative to the stem 15.

The axle B in the case illustrated is a simple, straight member round in cross section and is carried by and extends between the lower end portions 12 of the arms 11. The particular axle shown in the drawings has a head 20 on one end at the exterior of the arm and has a nut 21 threaded on the other end and engaging the exterior of the other arm. The wheel C is carried by or on the axle B and is located between the arms 11 of yoke A.

The particular wheel illustrated has or is formed by a disc-shaped body 25 provided with a central bushing 26. In the case illustrated the wheel or body 25 is formed so that it has substantially flat parallel opposite sides 27 and it has a round tread or periphery 28 concentric with the opening 29 in the body that carries the bushing 26. The opening 29 is round in cross section, is concentric with the periphery 28 of the body, and the bushing 26 is a metallic bushing tight in the body 25, is coextensive with the opening 29 and has round central opening 30 that carries the axle B.

In carrying out the invention the body 25 of the wheel may be formed of any suitable material, for example, it may be advantageously formed of a rubber or rubber-like composition and is sufficiently hard to stay in shape and is of such character as to have the desired wear-resisting characteristics.

The lubricating means as provided by the present invention involves a storage chamber 31 in the body 25 of the wheel adapted to carry a supply of lubricant L. A lubricant handling duct 32 serves to meter or control flow of lubricant and extends from chamber 31 to and laterally through the bushing 26 to conduct lubricant to the axle B. In the preferred construction the duct 32 has an enlarged end portion 34 in communication with the chamber 31 and serving to connect the chamber and the duct.

In the particular form of the invention illustrated the chamber 31 is formed by a round opening or bore 40 in body 25 disposed radially relative to the central axis of the wheel. The round opening 40 enters the body 25 from the periphery 28 thereof and extends radially inward to the point where it connects with the enlarged portion 34 of duct 32. In the preferred construction the portion 34 of duct 32 is smaller in diameter than the hole 40 with the result that the bottom of the hole forms an outwardly facing shoulder 35.

The present invention provides a piston 42 in the chamber 31 where the chamber 31 is formed by a round hole or bore 40, the piston may be a simple round element slidably fed in the bore. A spring, preferably a helical compression spring 50, is carried in the chamber 40 outward of the piston 42 and is confined under compression between piston 42 and a plug 51 in the outer end portion of opening 40. In the preferred construction the plug 51 is made tight in the opening 40 and in practice it may be either forced fed into opening 40 or may be bonded therein by a suitable adhesive as circumstances may require.

With the construction just described a body of lubricant L in the chamber 31 inward of piston 41 is normally yieldingly urged radially inward or is maintained under pressure and the lubricant fed through the enlarged portion 34 of duct 32 and through the duct 32 to the axle B. In the preferred construction an annular channel or groove 50 is provided in the wall of the opening 30 through bushing 29 and this channel communicates with the duct 32 so that lubricant is distributed entirely around the axle. As the structure operates, that is, as the wheel turns on the axle and as the lubricant escapes or is consumed, it is replenished by lubricant from the chamber 31.

For the purpose of replenishing the supply of lubricant L in the chamber 31, a section 60 of wheel body 25 is provided communicating with or adjacent a lubricant carrying part, and an implement 61 is provided for introduction through the wall section 60 for supplying lubricant into the structure. In the case illustrated a lateral opening 62 if formed or provided in the body 25 of the wheel extending from the enlarged portion 34 of the duct 32 to the exterior of the body at one side of the wheel. The section 60 is in the nature of a block or plug of elastic material carried tightly in the opening 60 and if desired bonded therein. In practice it is preferred to form the body 60 of an elastic material such as rubber, in which case a soft rubber is employed as compared with the hard rubber or rubber-like formation employed for the body 25 of the wheel. The implement 61 is preferably an elongate tubular member in the nature of a needle and it may be carried by a lubricant supply means or mechanism 70 so that lubricant can be fed through it. In the case illustrated the lubricant supply mechanism is a cylinder and piston mechanism provided with a handle 72 and is adapted to be manually operated to force lubricant under pressure through the needle 61.

The needle 61 may be readily forced or inserted through the section 61 so that its open end 75 occurs in the enlarged portion of duct 32. As the mechanism 70 is operated lubricant is forced from the end 75 of needle 61 and as a result of being forced into the structure it moves the piston 42 outwardly against the action of the spring 50 until the chamber 31 is suitably charged or filled. When the desired charge of lubricant has been established in the chamber 31 the needle 61 is withdrawn and the hole made in the section 60 to admit the needle is immediately closed by the elastic action of the section 60 so that no lubricant escapes therethrough. In practice a suitable block or rubber employed for section 60 can be pierced by the needle 61 numerous times without material damage or deterioration, and as a result of the construction provided the mechanism can be recharged with lubricant whenever necessary.

In the particular construction illustrated the wheel C is spaced from the arms 11 of the yoke A by cup-shaped washers 80. The washers 80 are of substantial size and one covers or overlaps the point where the section 60 occurs at the exterior of the wheel. In this case an access opening 81 is provided in that washer 80 as clearly illustrated in the drawings. The washers 80 being cup-shaped not only space the wheel between the arms of the yoke but shield the axle where the wheel occurs thereon, and also catches lubricant that may squeeze from between the axle and wheel and which might otherwise work to the outer peripheral portion of the wheel.

Having described only a typical preferred form and application of my invention, I do not wish to be limited or restricted to the specific details herein set forth, but wish to reserve to myself any variations or modifications that may appear to those skilled in art and fall within the scope of the following claims.

Having described my invention, I claim:

1. In combination, a wheel having a disc shaped body with a central opening through it from one side to the other, and having a hole extending into it from its periphery and connected with the opening by means of a duct, a plug in the hole adjacent the periphery of the body closing the hole to form a chamber adapted to carry lubricant, an axle in the opening and supporting the wheel, and a spring pressed piston in the chamber adapted to move longitudinally therein and to feed lubricant therefrom to the duct for use at the axle, the body having an aperture therein extending from the duct to one side of the body, and a section of elastic material tight in the aperture closing it and adapted to be pierced by a lubricant injector.

2. A caster including, a yoke having spaced arms, an axle carried by and extending between the arms, a wheel on the axle and having a central bushing bearing on the axle, the wheel being disc shaped and having a radially disposed hole therein extending inwardly from the periphery and having a duct portion extending through the bushing to the axle, a plug fixed in the hole adjacent the periphery of the wheel and defining a closed lubricant carrying chamber, a piston in the chamber, a spring between the plug and piston normally yieldingly urging the piston to press lubricant through the duct and to the axle, the wheel having an aperture in one side communicating with the duct, and a section of resilient material in the aperture and adapted to pass a lubricant injector.

3. A caster including, a yoke having spaced arms, an axle carried by and extending between the arms, a wheel on the axle and having a central bushing bearing on the axle, the wheel being disc shaped and having a radially disposed hole therein extending inwardly from the periphery and having a duct portion extending through the bushing to the axle, a plug fixed in the hole adjacent the periphery of the wheel and defining a closed lubricant carrying chamber, a piston in the chamber, a spring between the plug and piston normally yieldingly urging the piston to press lubricant through the duct and to the axle, the wheel having an aperture in one side communicating with the duct and a section of resilient material in the aperture and adapted to pass a lubricant injector, and washers between the wheel and arms and one overlying the said aperture and having an opening registerable with the aperture.

4. A caster including, a yoke having spaced arms, an axle carried by and extending between the arms, a wheel on the axle and having a central bushing bearing on the axle, the wheel being disc shaped and having a radially disposed hole therein extending inwardly from the periphery and having a duct portion extending through the bushing to the axle, a plug fixed in the hole adjacent the periphery of the wheel and defining a closed lubricant carrying chamber, a piston in the chamber, a spring between the plug and piston normally yieldingly urging the piston to press lubricant through the duct and to the axle, the wheel having an aperture in one side communicating with the duct and a section of resilient material in the aperture and adapted to pass a lubricant injector, and washers between the wheel and arms and one overlying the said aperture and having an opening registerable with the aperture, the washers being cup shaped and opening toward the wheel.

5. In combination, a wheel having a disc-shaped body with a central opening through it from one side to the other, and having an elongate hole forming a chamber adapted to carry lubricant and spaced from the opening and connected therewith by a duct, an axle in the opening and supporting the wheel, and a spring pressed piston in the chamber adapted to move longitudinally therein and to feed lubricant therefrom to the duct for use at the axle, the body having an aperture therein extending from the duct to one side of the body, and a section of elastic material tight in the aperture closing it and adapted to be pierced by a lubricant injector.

6. In combination, a wheel having a disc-shaped body with a central opening through it from one side to the other, and having an elongate hole forming a chamber adapted to carry lubricant and spaced from the opening and connected therewith by a duct, a plug closing the outer end of the hole to define the chamber, an axle in the opening and supporting the wheel, and a spring pressed piston in the chamber adapted to move longitudinally therein and to feed lubricant therefrom to the duct for use at the axle, the body having an aperture therein extending from the duct to one side of the body, and a section of elastic material tight in the aperture closing it and adapted to be pierced by a lubricant injector.

7. In combination, a wheel having a disc-shaped body with a central opening through it from one side to the other, and having a hole extending into it from its periphery and connected with the opening by means of a duct, an axle in the opening and supporting the wheel, a spring pressed piston slidable in the hole adapted to move longitudinally therein and to feed lubricant therefrom to the duct for use at the axle, the body having an aperture therein extending from the duct to one side of the body, and a section of elastic material tight in the aperture closing it and adapted to be pierced by a lubricant injector.

References Cited in the file of this patent

UNITED STATES PATENTS

| | | |
|---|---|---|
| 453,014 | Lunkenheimer | May 27, 1891 |
| 824,918 | Eareckson | July 3, 1906 |
| 1,006,059 | Carr | Oct. 17, 1911 |
| 1,140,056 | Nicol | May 18, 1915 |
| 1,616,425 | Fink | Feb. 1, 1927 |
| 2,523,659 | Heffernan | Sept. 26, 1950 |
| 2,591,129 | Brouwer | Apr. 1, 1952 |

FOREIGN PATENTS

| | | |
|---|---|---|
| 434,279 | Great Britain | Aug. 26, 1935 |